Dec. 29, 1953 W. V. CZARNECKI, JR., ET AL 2,664,312
OIL BURNER FILTER
Original Filed Feb. 21, 1950
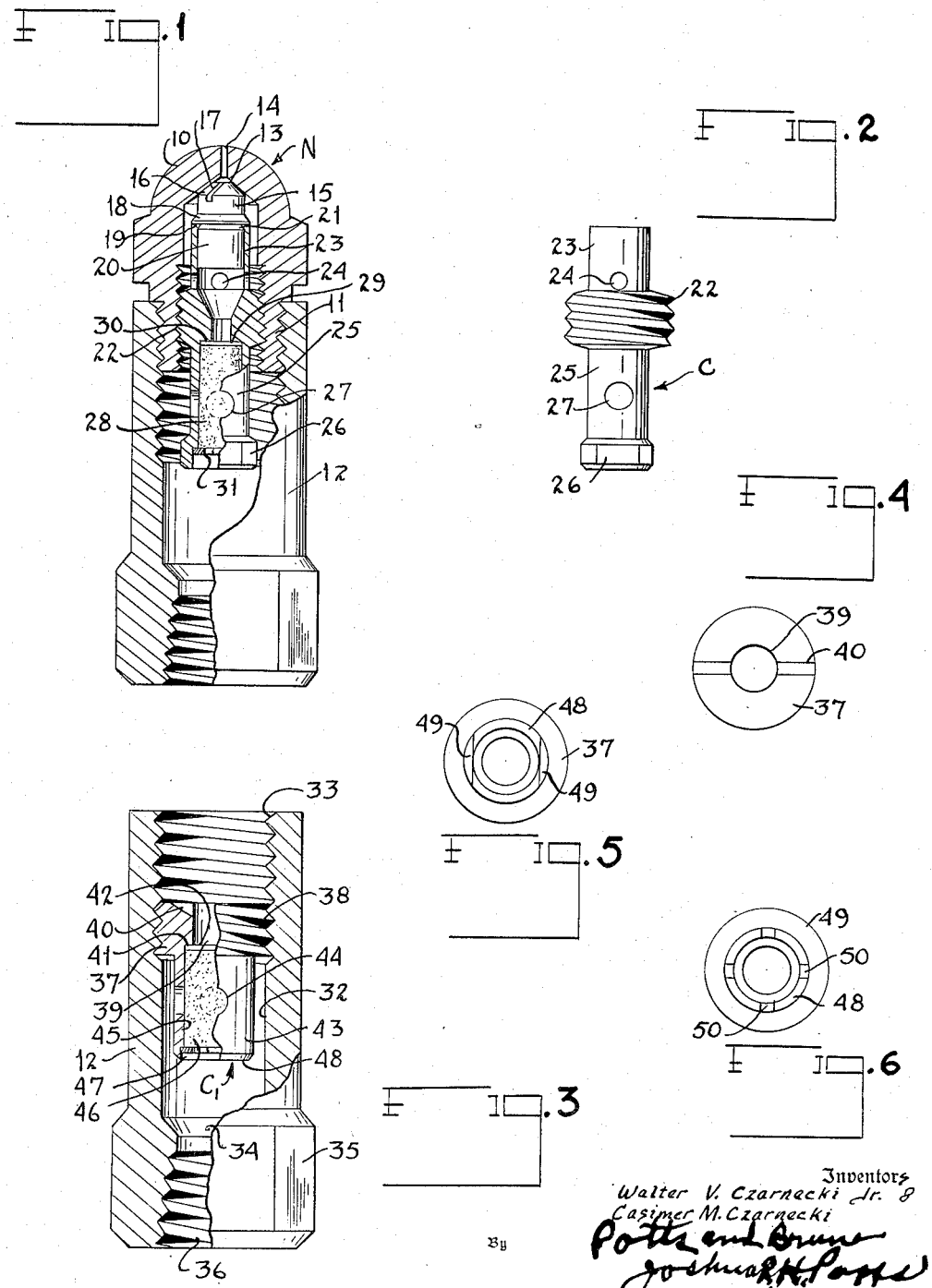
Inventors
Walter V. Czarnecki Jr. &
Casimer M. Czarnecki
Their Attorneys Patented Dec. 29, 1953

2,664,312

UNITED STATES PATENT OFFICE 2,664,312

OIL BURNER FILTER

Walter V. Czarnecki, Jr., Baederwood, and Casimer M. Czarnecki, Philadelphia, Pa., assignors to Eddington Metal Specialty Company, Eddington, Pa., a copartnership Original application February 21, 1950, Serial No. 145,494. Divided and this application December 22, 1950, Serial No. 202,242

2 Claims. (Cl. 299—107)

The present invention relates to oil burner filters and is concerned primarily with a filter that is immediately associated with the spray nozzle of an oil burner. This application is a division of the copending application of Walter V. Czarnecki, Jr., and Casimer M. Czarnecki, Serial Number 145,494, filed February 21, 1950, now Patent No. 2,631,892 granted March 17, 1953 and entitled "Oil Burner Filter."

At the present time just about every oil burner installation includes a spray nozzle. Such nozzles are characterized by the presence of a small orifice through which the oil is forced under pressure to give the atomized or spray effect. With the modern installations these orifices are often quite small, in some instances having a diameter of three one-thousandths of an inch. It is evident that such fine orifices are very easily clogged up by any fine solid particles which may be present in the fuel oil which is forced therethrough.

A modern oil burner installation also ordinarily includes a storage tank for the fuel oil and a pump for building up a required degree of pressure on the oil. Because of the danger of clogging up the orifice in the spray nozzle it has been the practice to include a filter of some type in the installation. This filter has either been located at the storage tank or at the pump. It is evident that in either case, the filter is removed a substantial distance from the spray nozzle. With such an arrangement there is a very likely possibility that small particles of metal will come loose from the pipes or conduits through which the fuel oil passes in traveling from the filter to the spray nozzle. Such small particles constitute a serious hazard which has resulted in the closing of the orifice in the spray nozzle.

The condition above outlined has been recognized by those working in this field. In view of this recognition, certain arrangements have been provided in attempt to screen or filter the fuel oil at the nozzle itself. One of these known arrangements involves the use of a wire screen or mesh. In order to effectively screen the oil and insure that no fine solid particles will get to the orifice, it has been necessary to employ a very fine mesh. However, when such a fine mesh is employed, the wires forming the mesh become coated with a film of the fuel oil which passes therethrough and when subject to the heat of the burner this film solidifies with the ultimate result that the fine mesh is closed and no oil gets to the nozzle. Thus, the use of a wire screen or mesh, sufficiently fine to effectively screen the oil, is indicated as not practical.

Another arrangement has been to employ a composite filter which is in the nature of a stone. Such a filter comprises a porous block which is made of fine particles or granules of metal which are bonded together in such a manner as to afford the porosity necessary for a filter. Such a composite block has been located immediately adjacent to the spray nozzle. However, inasmuch as these filter blocks are subject to heat and pressure, it has been found that under practical conditions small particles of the filter block itself work loose and clog up the orifice in the spray nozzle.

With the foregoing conditions in mind, the present invention has in view, as a highly important objective, the provision of a spray nozzle having an orifice through which fuel oil is adapted to be passed under pressure together with a filter assembly which is immediately associated with the spray nozzle. This filter assembly includes as its characteristic element a mass of fibrous filter material such as felt through which the oil must pass in order to get to the spray nozzle.

One type of oil burner nozzle with which this invention is concerned comprises a dome-like member formed with the small orifice above mentioned which opens into an internal conical seat. Engaging this seat is a core member formed with diagonal kerfs, the inner ends of which terminate a slight distance from the orifice. Another highly important object of the invention is to provide, in combination with an oil burner nozzle of the type above indicated, a filter assembly including a filter holding cage having a tubular extension which extends up into the nozzle proper and engages the core member to hold the latter in position.

Ordinarily the oil burner nozzle has a neck or extension which is externally threaded and screwed into a body or coupling which is in turn connected to a conduit leading to the source of supply of fuel oil. It is an established fact that the internal threads on this body or coupling member are standardized throughout the industry; whereas, the threaded socket on the nozzle itself will vary with different manufacturers.

Thus, another highly important object of the invention is to provide a filter assembly which is adapted to be mounted on the body or coupling rather than on the nozzle proper, although in immediate proximity to the latter.

Various other more detailed objects and advantages of the invention such as arise in connection with carrying out the above noted ideas in a practical embodiment will, in part become apparent, and in part be hereinafter stated as the description of the invention proceeds.

The invention therefore comprises the combination of a spray nozzle having a dome-like portion formed with an orifice together with a core member that cooperates with this orifice and a filter assembly including a filter holding cage that is screwed into said nozzle and has a portion engaging said core member to hold the latter in position. In a modified form the filter holding cage is screwed into a coupling member that is carried by the nozzle rather than the nozzle itself.

For a full and more complete understanding of the invention, reference may be had to the following description and accompanying drawing wherein:

Figure 1 is a side view partly in section and partly in elevation of a spray nozzle and coupling member carried thereby with a filter assembly applied thereto in accordance with the precepts of this invention.

Figure 2 is a view in side elevation of the filter assembly per se of Figure 1.

Figure 3 is another side view partly in section and partly in elevation showing a modified form of filter assembly as mounted in a body or coupling rather than the nozzle.

Figure 4 is a top plan view of the filter assembly shown in Figure 3.

Figure 5 is a bottom plan view; and

Figure 6 is a bottom plan view of a slight modification.

Figure 1 shows a nozzle N having a dome-like portion 10 and an extension 11 which is both internally and externally threaded. A body or coupling member 12 is internally threaded at one end and screwed into this internally threaded portion is the threaded extension 11.

Within the dome 10 is a conical seat 13 with an orifice 14 extending through the dome and located at the apex of the conical seat. A core member 15 has an upper conical surface 16 in engagement with the seat 13 and this surface is formed with cuts or kerfs 17. Extending radially outwardly about the core member 15 is a flange 18 presenting a downwardly exposed shoulder 19. The core member 15 also carries a downwardly depending skirt 20, the upper edge of which is spaced from the shoulder 19 by an annular recess 21.

The filter assembly includes as its main element a filter holding cage which is referred to in its entirety by the reference character C. The cage C includes a central body member 22 which is externally threaded and screwed into the internal threads of the neck 11. Extending upwardly from the body member 22 is a tubular extension 23 formed with ports 24. This tubular extension 23 encloses the skirt 20 and at its upper end edge engages the shoulder 19 of the flange 18 so as to hold the core member 15 in position within the nozzle N with the conical surface 16 in engagement with the conical seat 13.

Depending downwardly from the body portion 22 is a lower tubular extension 25 terminating at its lower end in an enlarged thickened portion which is formed as a hex 26 for wrench-engaging purposes. This extension 25 is formed with ports 27 and positioned therewithin is a filter plug 28. The filter plug 28 engages a screen disc 29 at its upper end and this screen disc bears against an internal shoulder 30 formed in the main body portion 22. A retaining ring 31 engages the lower end of the filter plug 28 and being mounted in a counterbored portion of the lower extension 25 with a pressed fit holds the plug 28 in position.

It is evident that the filter holding cage C not only carries the essential elements of the filter assembly but also serves as a means for maintaining the core 15 in proper position within the nozzle N.

The modification

Figure 3 shows a body member or coupling 12 which is substantially identical with the same body member or coupling shown in Figure 1 wherein it is similarly designated. The coupling member 12 has a bore 32, the upper portion of which is threaded and shown at 33. This bore 32 terminates in a truncated conical shoulder 34. The end portion opposite to the threads 33 is of increased thickness and externally formed as a hex 35 for wrench-engaging purposes. This thickened portion is also formed with a tapered threaded socket 36 whereby it is adapted for connection to a fuel oil conduit.

A filter assembly is shown as including a cage C1 as its main element. The cage C1 comprises a body portion 37 which is externally threaded as represented at 38 and the threads 38 are screwed into the threads 33 to position the cage C1 within the bore 32. The main body portion 37 is formed with a central bore 39 and the upper surface thereof is formed with a crosscut 40 which is adapted to receive a screw driver for the purpose of screwing the cage C1 into the threads 33.

The bore 39 terminates at a shoulder 41, and bearing against this shoulder is a screen disc 42. Depending downwardly from the main body portion 37 is a tubular extension or sleeve 43 formed with ports 44 and having an internal bore 45. Received in the bore 45 is a felt filter plug 46 and the upper end of this plug bears against the screen disc 42. The felt plug 46 is held in position by a retaining ring 47 which is fitted into a counterbored section by a pressed fit.

There are occasions when the cage C1 will be screwed down sufficiently far to cause the lower edge of the sleeve 43 to engage the seat 34. Moreover, this lower end edge is ordinarily of the conical formation depicted at 49 so that if this engagement takes place oil will be prevented from flowing out about the cage C1. To avoid this condition one of two arrangements may be employed. Figure 5 shows the lower end edge of the sleeve 43 as cut away at diametrically opposite points 48 through which the fuel oil may pass. Figure 6 shows a slightly different arrangement in which the lower end of the sleeve 43 is formed with four notches or cuts 50 which are spaced ninety degrees apart.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

What is claimed is:

1. In combination, an oil burner nozzle, including a dome-like portion having an internal conical seat and an orifice communicating with said seat at the apex thereof, said nozzle also having an extension remote from the dome-like portion which is internally threaded, a core member in said nozzle having a conical surface engaging said seat and formed with kerfs, and a filter assembly assembled on said nozzle, said filter assembly including a filter holding cage comprising an intermediate body portion that is externally threaded and screwed into the internal threads of said extension, a tubular extension extending upwardly from said body portion and engaging said core member to hold the latter in position in said nozzle, a depending tubular extension carried by said intermediate body portion and formed with ports, a screen disc positioned within said cage, a felt filter plug within said depending extension and engaging said screen disc, and means for maintaining said filter plug assembled in said depending extension.

2. In combination, an oil burner nozzle including a dome-like portion having an internal conical seat and an orifice communicating with said seat at the apex thereof, said nozzle also having an extension remote from the dome-like portion which is internally and externally threaded, a core member in said nozzle having a conical surface engaging said seat and formed with kerfs, a flange outstanding from said core member presenting a downwardly exposed shoulder and a skirt carried by said core member and disposed beneath said shoulder, and a filter assembly assembled on said nozzle, said filter assembly including a filter holding cage comprising an intermediate body portion that is externally threaded and screwed into the internal threads of said extension, a tubular extension extending upwardly from said body portion receiving said skirt, engaging said shoulder, and formed with ports, a depending tubular extension carried by said intermediate body portion and formed with ports, a screen disc positioned within said cage, a felt filter plug within said depending extension and engaging said screen disc, means for maintaining said filter plug assembled in said depending extension, and a coupling member having a bore that is internally threaded at one end with the internal threads receiving the external threads of said extension.

WALTER V. CZARNECKI, Jr.
CASIMER M. CZARNECKI.

References Cited in the file of this patent

UNITED STATES PATENTS

| Number | Name | Date |
|---|---|---|
| 1,140,758 | Miller | May 25, 1915 |
| 1,335,899 | Kahlenberg | Apr. 6, 1920 |
| 1,876,377 | Wilson | Sept. 6, 1932 |
| 1,982,871 | Hubbard | Dec. 4, 1934 |
| 2,071,920 | Czarnecki | Feb. 23, 1937 |
| 2,145,047 | Goldkamp | Jan. 24, 1939 |
| 2,361,818 | Brightwell | Oct. 31, 1944 |

FOREIGN PATENTS

| Number | Country | Date |
|---|---|---|
| 358,115 | Italy | Apr. 7, 1938 |